United States Patent [19]

Horwitt et al.

[11] 4,230,931
[45] Oct. 28, 1980

[54] ELECTRIC CIGAR LIGHTER

[75] Inventors: Laurence G. Horwitt, New Haven; Donald J. Mattis, Norwalk, both of Conn.

[73] Assignee: Sun Chemical Corporation, New York, N.Y.

[21] Appl. No.: 950,023

[22] Filed: Oct. 10, 1978

[51] Int. Cl.$^3$ .............................................. F23Q 7/24
[52] U.S. Cl. .................... 219/265; 219/264; 219/267; 219/512; 337/348; 361/105
[58] Field of Search ............... 219/260, 263, 264, 265, 219/266, 267, 270, 512, 376, 536; 337/348; 338/263; 361/105

[56] References Cited

U.S. PATENT DOCUMENTS

| | | | |
|---|---|---|---|
| 2,207,601 | 7/1940 | Shakespeare et al. | 219/265 |
| 2,213,373 | 9/1940 | Bahr | 219/265 |
| 2,220,978 | 11/1940 | Shakespeare et al. | 219/265 |
| 2,248,017 | 7/1941 | Cohen | 219/265 |
| 2,999,142 | 9/1961 | Woodhall et al. | 337/348 |
| 3,288,353 | 3/1966 | Lybrook | 219/265 |
| 3,760,150 | 9/1973 | Fenn et al. | 219/265 |
| 4,130,815 | 12/1978 | Horwitt et al. | 219/267 X |

FOREIGN PATENT DOCUMENTS 1910949 3/1969 Fed. Rep. of Germany ............ 219/265
2755620 12/1977 Fed. Rep. of Germany ............ 219/265

Primary Examiner—Volodymyr Y. Mayewsky
Attorney, Agent, or Firm—Cynthia Berlow

[57] ABSTRACT

An electric cigar lighter for automobiles and the like, comprising a holder device presenting an outwardly facing socket, and an ignitor plug receivable in the socket. The plug comprises a manually operable part, and carries a heating element which is electrically connected in circuit with a normally-closed heat-responsive switch that is disposed in the holder device. The socket, in addition to its grounding circuit, has a "hot" contact which is engageable with a cooperable contact on the plug to effect the circuit through the heating element when the manually operable part is depressed. The holder device also carries a bimetallic member which is engageable with one of the parts of the switch. The member normally occupies a closed-circuit position wherein it is separated from the one switch part. When the manually operable part of the ignitor plug is depressed and held, the cooperable contact of the ignitor plug is brought into engagement with the "hot" contact of the socket, this effecting energization of the heating element and resulting in rapid heating of the bimetallic member. After several seconds, the member snaps to a circuit-opening position wherein it causes disengagement of the switch parts, and results in de-energization of the element. Central portions of the bimetallic member are free and not attached anywhere to any parts of the switch or socket, but instead are merely disposed in close proximity to one switch part, such that the member can quickly effect opening of the switch without need for mechanical securement of its central actuator portion. Accordingly there are eliminated the many problems which were previously associated with conventional fastenings made to a bimetallic member, such as securing a contact to the member, etc. Improved reliability and operation, together with significantly lower manufacturing and assembly costs, are thus realized.

38 Claims, 17 Drawing Figures

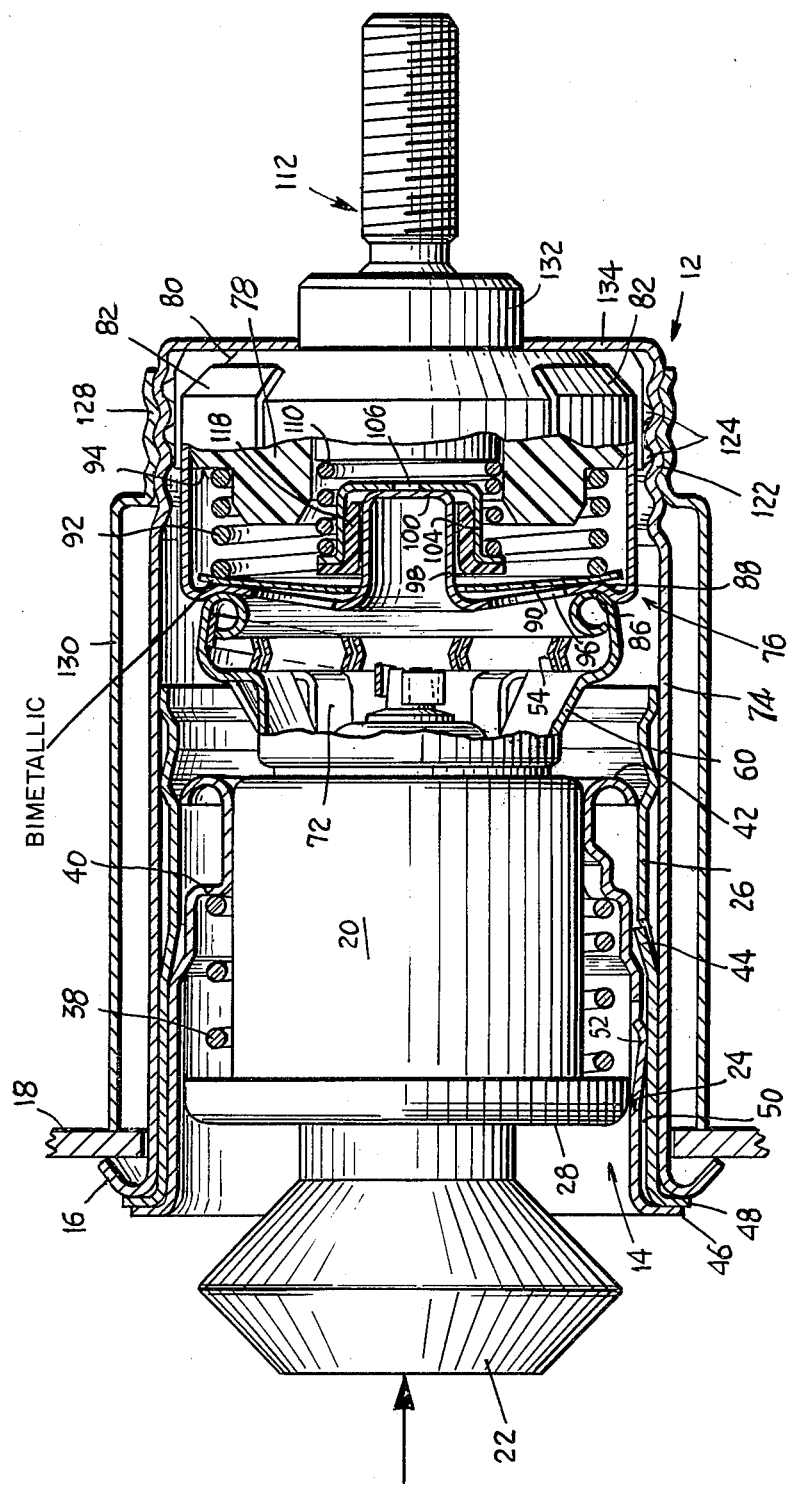

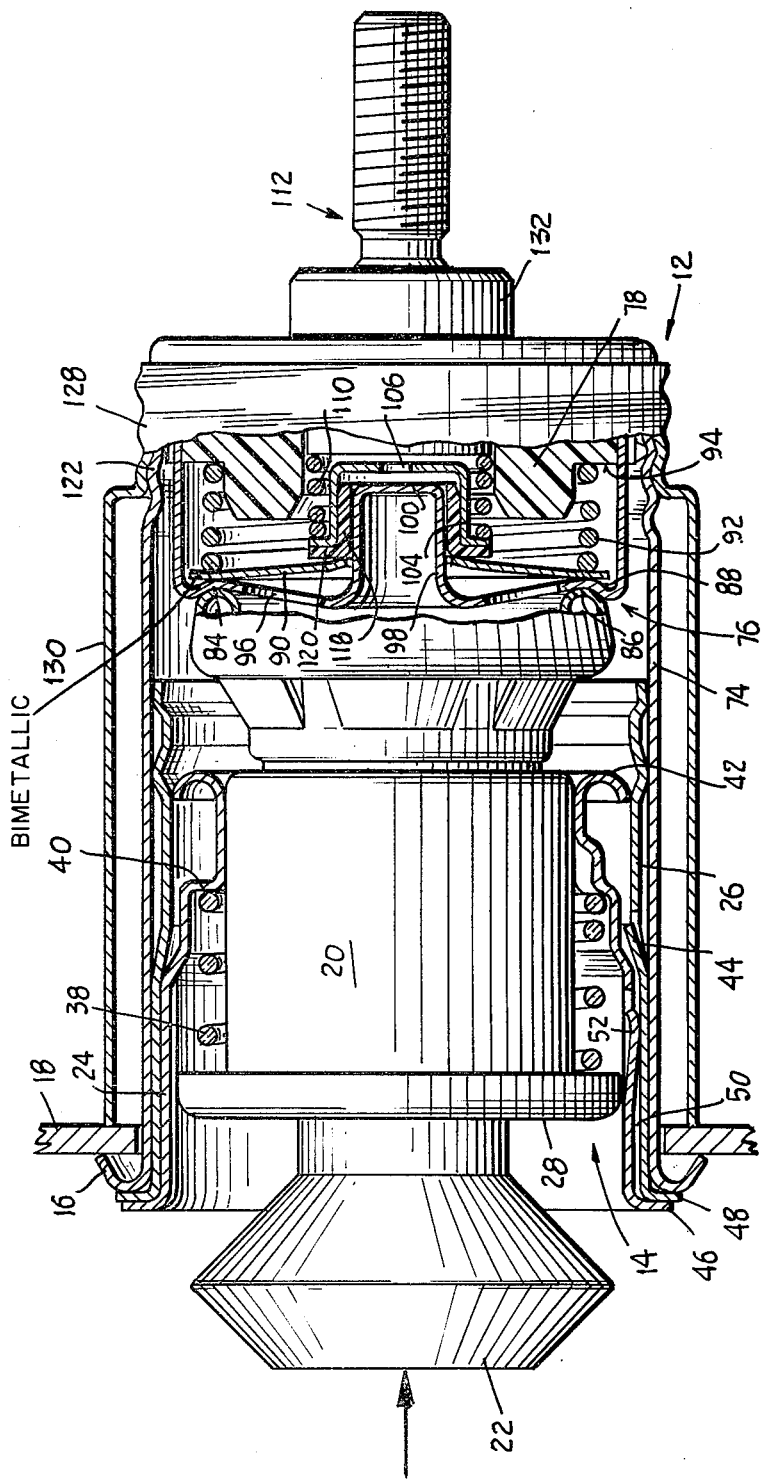

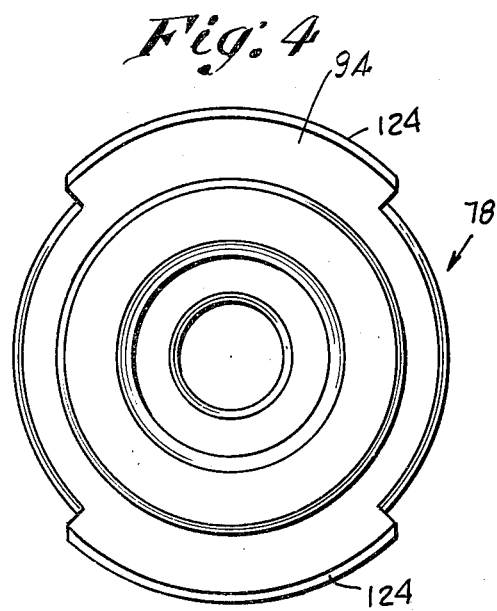
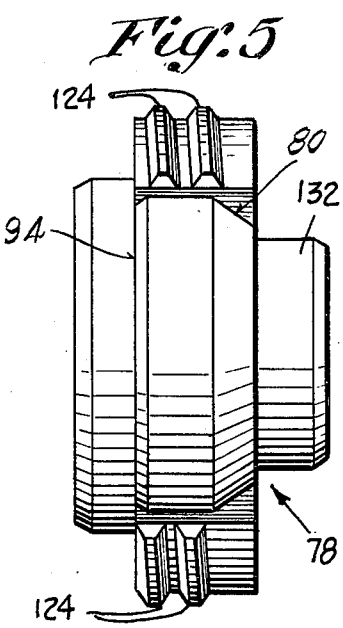
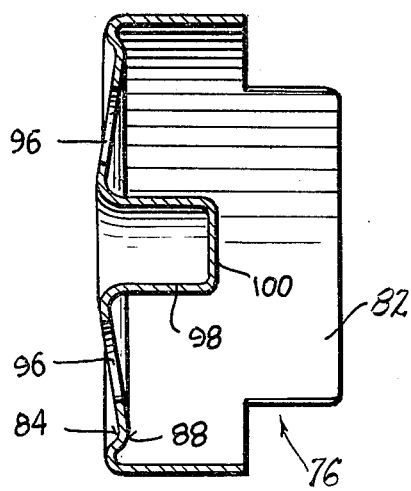
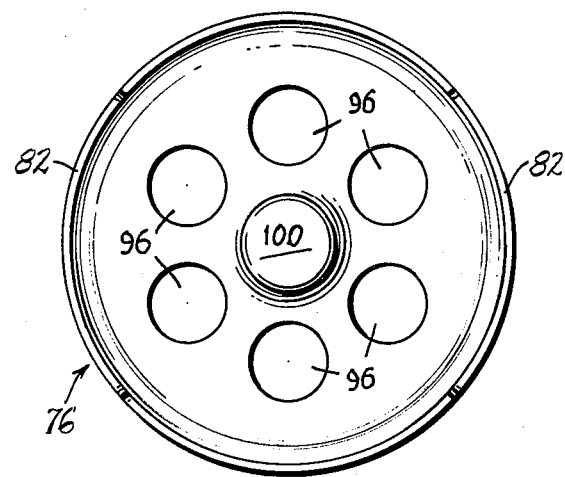
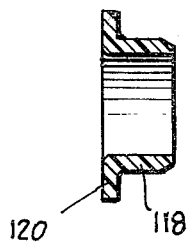
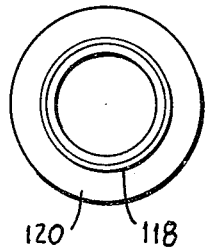
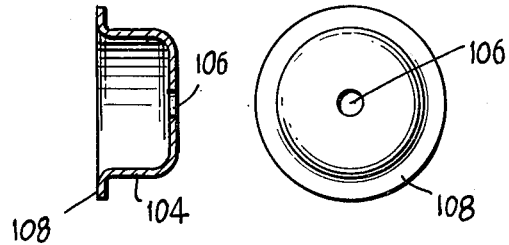

ELECTRIC CIGAR LIGHTER

CROSS REFERENCES TO RELATED APPLICATIONS

1. Copending application in the names of Laurence G. Horwitt and Donald J. Mattis, U.S. Ser. No. 873,771, filed Jan. 31, 1978, now U.S. Pat. No. 4,177,374, entitled AUTOMATIC ELECTRIC CIGAR LIGHTER, and having common ownership with the present application.

2. Copending application in the names of Laurence G. Horwitt and Donald J. Mattis, U.S. Ser. No. 868,935, filed Jan. 12, 1978, entitled MANUAL ELECTRIC CIGAR LIGHTER, and having common ownership with the present application.

3. Copending application in the names of Laurence G. Horwitt and Donald J. Mattis, U.S. Ser. No. 841,836, filed Oct. 13, 1977, now U.S. Pat. No. 4,168,422, entitled AUTOMATIC ELECTRIC CIGAR LIGHTER, and having common ownership with the present application.

4. Copending application in the names of Laurence G. Horwitt and Donald J. Mattis, U.S. Ser. No. 949,657, filed Oct. 10, 1978, entitled AUTOMATIC ELECTRIC CIGAR LIGHTER WITH BASE SWITCH, and having common ownership with the present application.

BACKGROUND

This invention relates generally to cigar lighter devices for automobiles and the like, and more particularly to lighters which are especially adapted to heat to useful incandescence in relatively short intervals of time.

In the past, large quantities of electric cigar lighter constructions have been proposed and produced. Generally they employed bimetallic spring fingers disposed in the socket of a holder device and which were engageable with the side surfaces of a heating element cup at the inner end of the ignitor plug. When the plug was depressed, the fingers latched over the sides of the cup, establishing a circuit through the heating element. As the element reached useful incandescence, the bimetallic fingers became heated and would then spread and release the cup and the ignitor plug, enabling the same to retract and break the circuit through the element.

Numerous refinements to this basic structure have been achieved over the years. However, problems sometimes arose, as when one of the bimetallic fingers, for reasons sometimes obscure, shifted into the path of the ignitor plug while the latter was being depressed, resulting in breakage and possible short-circuiting of the socket. This would cause either a blown fuse or else a burned-out wiring harness, depending on the degree of current overload protection built into the particular electrical system of the automobile. In other cases, the bimetallic fingers underwent an aging deformation after prolonged use. When this occurred, the socket usually had to be removed, in most cases involving work underneath or to the rear of the dashboard. Where the socket was not readily accessible, such repair or replacement was sometimes difficult, costly and time consuming.

Typically in automatic lighters there is a period of ten to fifteen seconds following actuation of the ignitor plug, until the heating element has reached useful incandescence to enable the plug to snap out in readiness for use. In the past, a number of efforts have been made to reduce this waiting time to just a few seconds. Several such innovative units have employed a bimetal disk disposed adjacent to the heating element, the disk itself constituting one contact of a switch which was adapted to open after the element reached incandescence. By positioning the disk right next to the element, response times on the order of only several seconds have been achieved, particularly when an applied voltage was used which exceeded the continuous rating of the heating element.

Prior lighters of the type employing bimetallic disks all had a number of distinct disadvantages. Generally where the contact area of the disk was at its center, the socket was arranged to secure the disk at its periphery. The mounting for the disk had to be such that it would not interfere with its flexing and snap-type movements. This imposed stringent requirements on the tolerances of both the disk and the part which carried it. Also, in most cases the disk constituted part of the current carrying circuit, and thus had to be insulated from the remainder of the socket. Accordingly, such mountings were often awkward and prone to malfunction in use.

In other constructions, as where the contact area of the disk was at its periphery, the disk was mounted by means of a stud passing through a hole in its center, the end of the stud being staked to hold the disk in place. The problem with this arrangement was that the support area was too small, and the disk eventually loosened, causing poor electrical contact with the stud. Or, if the support area was made sufficiently large, then its freedom of movement was impaired, as well as its proper functioning. Since both the stud and the disk were current-carrying members, any loosening caused either an excessive voltage drop, or else an open circuit, resulting in malfunction or failure of the device. Where the bimetallic disk itself was employed as one contact of the circuit-breaking switch, there occurred burning and pitting at the points of contact, this resulting in both a poor electrical connection and in deterioration of the disk itself, after a relatively short period of use. Moreover, where the disk was a current carrier, the relatively heavy current flow associated with such ignitor devices resulted in resistance-heating of the disk, aside from the heating effect due to its proximity to the coil. The resistance or self-heating effect depended on the resistances of the electrical path through the disk and stud; there were thus introduced other undesirable variables into the design of the lighter, which caused problems during manufacturing runs where large numbers of units were to be mass produced, from components possibly having slightly different physical and/or electrical characteristics. In addition, in constructions where the bimetallic member was arranged to carry the heating element current, the response time of the member was adversely affected by changes which occurred in the vehicle electrical system, such as drops in the supply voltage resulting from the application of momentary loads by other equipment in the vehicle, or surges in the supply voltage resulting from variation in the rate of charging by the vehicle's alternator or generator. Such variations in the applied voltage resulted in corresponding changes in the self-heating effect of the current on the bimetallic member, thus tending to exaggerate existing non-uniformities of response over prolonged periods of operation and under different environmental conditions.

Applicants' copending application, U.S. Ser. No. 868,935 identified above, discloses an arrangement for a fast-acting manual cigar lighter wherein the manually operable part of the ignitor plug is depressed and held for several seconds, to thereby close the heating element circuit and cause the element to reach incandescence, after which the circuit is automatically opened by a disk-like bimetallic member which is carried in the plug itself.

This particular construction has been found to operate quite well from the standpoint of good reliability and long life expectancy. The number of individual parts required in this prior design has led to attempts to simplify the construction somewhat, so as to reduce the overall manufacturing cost and result in easier assembly. Cigar lighters of the above type are typically built in manufacturing runs of thousands of units. Some of the newer luxury automobiles are provided with four or more of such lighter devices; it can be readily appreciated that the annual sales of such units can easily run into the hundreds of thousands. Accordingly any saving which can be realized, as by reducing the number of parts involved, reducing the cost of such parts, and simplifying the assembly, becomes especially important from an economic standpoint. Of course, while it is considered desirable to reduce the costs of such items as much as possible, it should be realized that these devices must perform in a satisfactory manner, with complete freedom from jamming or malfunctioning, over the projected life of the automobile, which can be many years. Conceivably such devices can be subjected to thousands of operations over the life of the car, and in fact, production samples are tested for performance in excess of such figures.

SUMMARY

The various mentioned drawbacks and disadvantages of prior cigar lighters are obviated by the present invention, which has for its main object the provision of a novel and improved electric cigar lighter which has fewer parts so that it is especially simple in its construction, while still being reliable in operation and capable of easy assembly with a minimum of time and effort.

A related object of the invention is the provision of an electric cigar lighter as above, which is characterized by the heat-responsive switching occurring in the socket, utilizing a unique arrangement which lends itself to low-cost, high production assembly techniques.

A further object of the invention is the provision of an improved electric cigar lighter in accordance with the foregoing, wherein the response time is on the order of only several seconds, thereby making the unit more convenient to operate and use.

Still another object of the invention is to provide an automatically controlled electric cigar lighter of the type employing a bimetallic member, wherein the latter is mounted in the holder device in a unique manner, with its central switch-actuating portion free and clear of all permanent attachment to any other parts.

Yet another object of the invention is to provide an improved electric cigar lighter as set forth above, wherein the bimetallic member is not connected in the heating element circuit, thereby being not subject to heating due to current flow through it but instead having its response governed entirely by heat transferred due to radiation and conduction from the heating element.

A feature of the invention is the provision of an electric cigar lighter as above characterized, wherein the bimetallic member is not affected by variations in the applied voltage due to changes in charging rate, load changes on the vehicle electrical system, etc. Due to the feature that the bimetallic member is not a part of the current-carrying circuit, improved operating consistency is obtainable between different units of the same manufacturing run.

The above objects and advantages are accomplished by the provision of an electric cigar lighter comprising a unique holder device presenting a socket with two contacts forming part of the energizing circuit, and an ignitor plug comprising a manually operable part, which is removably carried in the socket and has a usual type of heating element at its inner end. Disposed in the holder device is a novel automatically controlled electrical switch which is connected in circuit with the heating element, and is normally closed. A bimetallic disk-like switch-actuator member is provided, also carried by the holder device and having its center portions free and clear of attachment to any other parts. The bimetallic member is disposed closely adjacent to the heating element so as to receive radiant heat therefrom, and has its actuator portion engageable with one part of the circuit-controlling switch. The arrangement is such that upon actuation of the manually operable part, the heating element is energized through the normally closed switch. After the element reaches useful incandescence, the bimetallic member snaps to a circuit-opening position wherein it opens the switch and deenergizes the heating element.

The bimetallic member, not being a part of the current-carrying circuit, undergoes no heating due to current flowing through it. Nor is it riveted, welded, staked, or similarly secured in place. Therefore its movement is not unduly restricted, being governed only by the radiant heat received from the heating element. The response time is thus not affected by the electrical resistance of the member, or by contact resistances associated with mounting and surface areas of the member itself. The large voltage variations encountered in the automobile supply, likewise, will not have any direct effect on the bimetallic member. Because the member remains substantially unmodified when placed in the environment of the lighter, it enjoys the inherent reliability of a simple bimetal part, since there exists no possibility of the member suffering damaging stresses resulting from welding, machining, staking, etc. In addition, the member is not employed as a contact, and accordingly there is no deterioration of the same, which might otherwise result from arcing or pitting. Moreover, since there is no part anywhere in the cigar lighter that is permanently attached to the center of the bimetallic member, there exists nothing to interfere with its normal snap or flexing movements under the influence of heat received from the heating element. Greatly improved reliability and long life expectancy are thus realized.

The manufacturing economies that are realizeable with the present construction enable the device to be produced inexpensively in large runs involving thousands of units. This is particularly important in the automobile industry where a great emphasis is placed on reducing the overall cost of the product as much as possible, without sacrificing overall reliability, or safety.

The above objects are further accomplished, in another form of the invention, by the provision of a novel and improved electric cigar lighter employing a holder device comprising a socket member, an ignitor plug receivable in the socket member and having a heating element at its inner end, an electrical switch connected in circuit with the heating element, and a unique bimetallic operator carried by one of the said members and arranged to open the switch in response to its heating. The operator is of substantially disk-like configuration, having a formed peripheral portion defining a shallow arcuate trough which provides a stronger spring return of the operator from its hot position to its cold position, following cooling of the heating element. It has been found that with such an arrangement, greatly increased reliability is realized, since there is eliminated the possibility that the bimetallic operator, once cooled, might not return of its own volition to the cold or closed-circuit position. This improved configuration for the bimetallic operator has the additional important advantage that the manufacture thereof does not entail any appreciable extra expense, since the punch which forms the operator can be made to include the peripheral trough formation, and the operator stamped out in a single operation, in the same manner as where such operators are manufactured in the conventional manner, that is, without a specially formed periphery.

In yet another form of the invention, the above objects are accomplished by the provision of a cigar lighter comprising a holder device presenting a socket having two contacts, an ignitor plug receivable in the socket and having a heating element at its inner end, and an insulating block for mounting one of the contacts in the holder device. In securing the insulating block in the holder, the latter has, on its metal tubular body portion, a rolled thread formation providing both external and internal threads. Cooperable projecting means are provided on the insulating block, engageable with the interior threads whereby the insulating block can be merely screwed into the body and held captive therein. In the event that it is desired to secure the holder device to the automobile dashboard by means of a screw shell having a thread formation at one end, the external screw threads provided on the body can conveniently accommodate the thread formation on the screw shell. Thus, with such an arrangement, the single rolled thread configuration on the body is seen to cooperate with both the insulating block, and the screw shell. This construction represents a distinct improvement from the economic standpoint, as can be readily appreciated. Moreover, the insulating block can be assembled to the tubular body of the holder device with suitable automatic assembly equipment, resulting in a further savings of time and labor.

Other features and advantages will hereinafter appear.

In the accompanying drawings, illustrating several embodiments of the invention:

FIG. 2 is a view like FIG. 1 but partly in elevation, showing the manually operable part of the ignitor plug as having been shifted to a deep position in the socket of the holder device and held. The bimetallic operator remains in its closed-circuit position, and the switch remains closed wherein there is effected energization of the heating element.

FIG. 3 is a view like FIGS. 1 and 2, wherein the bimetallic member or disk associated with the switch has been rapidly heated due to its close proximity to the energized heating element, and has shifted from its closed-circuit position to its circuit-opening position, thereby separating the switch contact parts and opening the circuit through the heating element.

FIG. 4 is a right end elevation of an insulating block carried by the holder device of the lighter of FIGS. 1-3, on which one of the socket contacts is carried.

FIG. 5 is a side elevation of the insulating block shown in FIG. 4.

FIG. 6 is an axial section of a cup-like base member carried by the receptacle.

FIG. 7 is an end elevation of the base member of FIG. 6.

FIG. 8 is an axial section of an insulating spacer and bearing sleeve employed in the cigar lighter of FIGS. 1-3.

FIG. 9 is an end elevation of the insulating spacer and bearing sleeve of FIG. 8.

FIG. 10 is an axial section of a contact cup employed in the cigar lighter of FIGS. 1-3.

FIG. 11 is an end elevation of the contact cup of FIG. 10.

Figure 1:
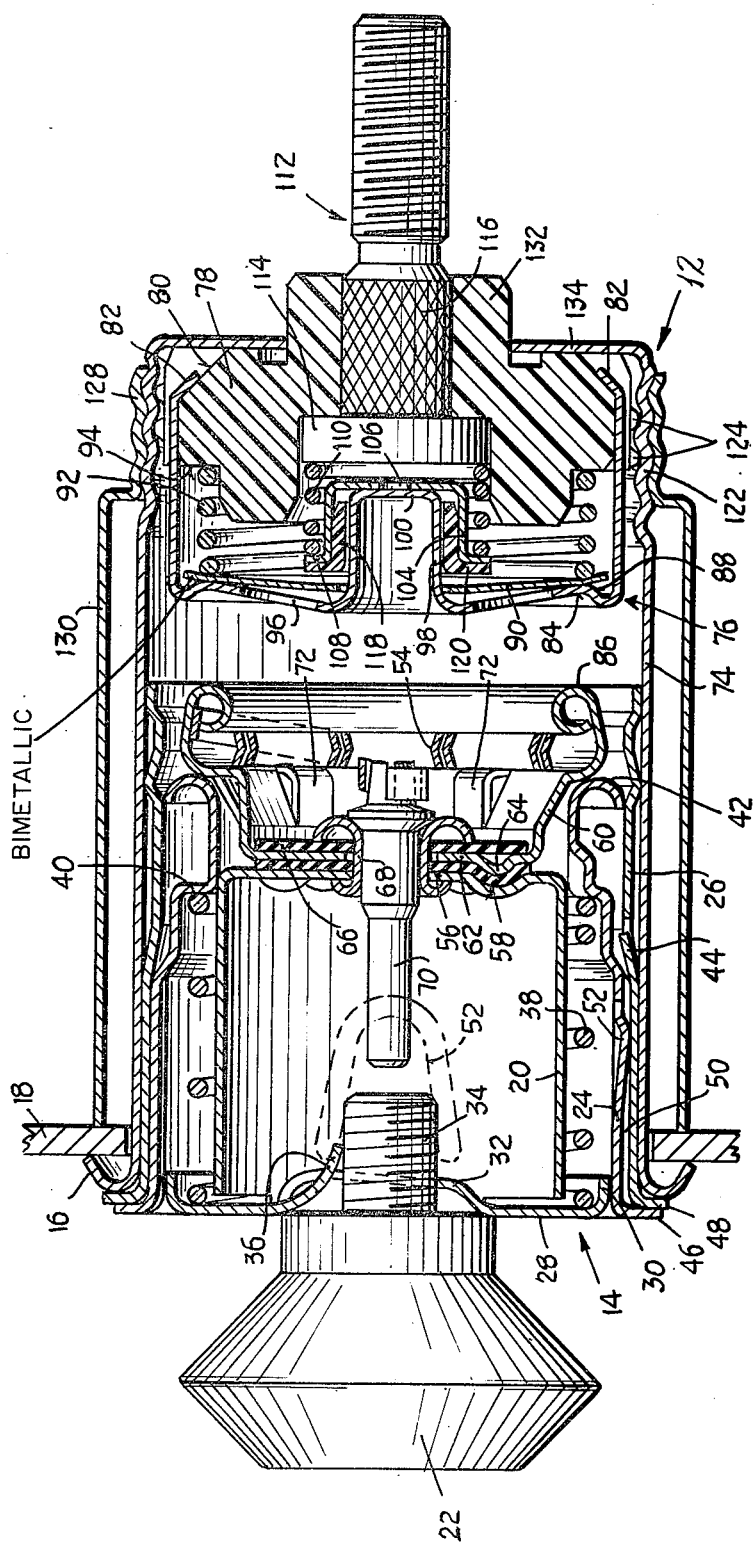
FIG. 1 is a vertical sectional view of the improved cigar lighter of the present invention, showing the ignitor plug disposed in the holder device or receptacle, in its unenergized or storage position and wherein a switch carried by the holder device is closed. The bimetallic switch actuator disk or member is in its closed-circuit position.

Referring first to FIGS. 1-3 there is illustrated a cigar lighter of the type adapted to be mounted on an automobile dashboard, comprising a receptacle or holder device 12 which includes a socket or socket member, and a generally cylindrical ignitor plug or plug member 14 receivable therein. The receptacle 12 has an outwardly extending annular flange 16 which engages the front surface of the automobile dashboard 18.

The ignitor plug 14 includes a tubular plug body and a manually operable part in the form of a spacer member 20 and a knob 22, the member 20 being generally in the form of a hollow cylinder. A friction sleeve 24 is telescopically carried on the spacer member 20, and a retractable ashguard generally designated 26 also constitutes part of the plug body and is telescopically carried by the spacer member 20 and movable thereon between limits, as will be later brought out. Disposed at the end of the spacer member is a cap 28 having an annular flange 30 extending past the periphery of the member. The cap is secured to the spacer member by a series of lugs (not shown) on the member which extend through corresponding slots (not shown) in the cap and which are bent radially inwardly. Such a construction is shown in applicants' U.S. Pat. No. 3,870,857. The cap also has a central indented portion 32 which is apertured to receive a threaded mounting stud 34 of the knob 22. The cap includes an integral spring pressure tooth 36 which engages the threads of the stud and enables the knob to be merely screwed into the cap as shown.

The flange 30 constitutes a seat for one end of a coil spring 38, the other end of the spring bearing against an internal shoulder 40 on the friction sleeve 24, the latter having an outwardly extending annular curl 42. The ashguard 26 has a series of lugs 44 struck from its annular wall portion, one of such lugs being shown in FIG. 1. In the present construction, three such lugs are disposed circumferentially about the body of the guard. The lugs 44 project inwardly into the path of the curl 42 when the ignitor plug is being withdrawn from the socket, and position the ashguard so as to encircle a heating element to be described below, as the plug is removed from the receptacle.

At its front end the friction sleeve 24 has an outwardly extending annular flange 46 which normally bears against a corresponding flange 48 on the ashguard 26. The limits of relative axial movement of the friction sleeve 24 with respect to the ashguard 26 are thus determined in one direction by the engagement of the flanges 46, 48, and in the other direction by engagement of the curl 42 with the lugs 44 of the ashguard. It is known that, in order to provide a smooth, non-binding and sliding engagement between the friction sleeve 24 and the ashguard 26, there can be provided on the cylindrical exterior surface of the sleeve a plurality of circumferentially spaced longitudinal ribs 50 which slidably engage the inner cylindrical surface of the ashguard. These ribs are similar to those shown in U.S. Pat. No. 3,870,857, and operate to reduce binding between the parts and prevent axial misalignment thereof. In order to exert frictional resistance against relative axial movement of the friction sleeve 24 and the ashguard 26, the cylindrical body of the sleeve is lanced at several locations, preferably spaced circumferentially about the sleeve, providing yieldable friction fingers 52 which bear with calibrated pressure against the inner cylindrical surface of the ashguard. One such finger is shown in dotted outline in FIG. 1. The pressure is sufficient to retain the ashguard in any selected axial positions to which it is moved with respect to the sleeve. The ribs 50 of the sleeve assure constant uniform spacing between the two parts, to prevent undesirable variation in the side pressure exerted by the inner surface of the guard on the friction fingers 52. Accordingly the base area of the fingers 52 will not be "sprung" by improper alignment. Disposed at the inner end of the ignitor plug 14 is a known spiral heating element or coil 54 which is preferably a ribbon-like strip of suitable electrical resistance alloy having a contoured V-shaped cross section, similar to the coil shown in applicant L. G. Horwitt's U.S. Pat. No. 3,235,707. The strip is wound to form a plurality of successive, interlocking convolutions. By reason of the interlocking engagement of each V-shaped convolution with adjacent convolutions, the heating element 54 takes the form of a substantially disk-like member and the interlocking of the successive convolutions resists axial displacement. As is well known, the resistance strip which forms the heating coil 54 can be made from an alloy containing aluminum and treated with sufficient heat to cause an aluminum oxide coating to be formed on the surfaces. By reason of the degree of electrical non-conductivity of the aluminum oxide coating, the surfaces of the successive convolutions of the coil, which are in contact with each other, resist current flow or short circuiting between convolutions.

The present lighter construction employs improvements found in newer lighters commonly referred to as "New Generation Lighters", see U.S. Pats. 3,870,857; 3,892,944 and 3,904,848. The improvements are therefore only briefly described herein, as follows: The inner end of the spacer member 20 has an in-turned annular or transverse wall 56 having a plurality of closely-spaced, circumferentially-arranged, nib-receiving concavities 58. The heating element 54 is carried in a metal cup 60 having a bottom or transverse wall 62, and a central aperture therein. In addition, this wall has a plurality of upwardly projecting nibs 64 shown as being bulbous or rounded and in equally-spaced annular relation, so disposed as to cooperate with and be received by corresponding concavities 58. Preferably, there is lesser number of nibs 64. The number of nibs is numerically divisible into the number of concavities. In a preferred form, the wall 56 has nine concavities 58 and the wall 62 of the contact cup has three up-standing nibs 64. The concavities 58 are sufficiently closely spaced and are contoured as shown so that protuberances on an adjacent surface, when pressed with moderate pressure into face-to-face engagement with the wall 56, will cause such protuberances to be guided rotationally into the nearest cooperating concavities 58.

Insulating washers or wafers 66 of deformable mica or similar insulating material are placed on each side of the wall 62 of the metal cup 60, the center hole portions thereof being aligned axially with a central aperture in the annular wall 56 of the spacer member 20 and the corresponding aperture in the wall 62 of the heating element cup 60. A grommet or eyelet 68 projects through these aligned holes and apertures and is flared outwardly as shown, to grip the wall 56 on one side and the wall 62 of the heating element cup 60 in a manner to hold the assembled spacer member 20, cup 60 and mica washers 66 in clamped together engagement. Portions of the one mica washer 66 between the walls 56 and 62 are deformed or distended as shown, by reason of the tendency of the nibs 64 thereunder to become self-aligned with the nearest concavities 58 and to become seated therein. The mica washer 66 is squeezed by the clamping action of the eyelet 68 to conform to the spaces between the respective nibs 64 and the cooperating concavities 58 opposite such nibs. The seating of the distended portions of the said one mica washer 66 in the nearest concavities serves to prevent rotational displacement between the heating element cup 60 and the spacer member 20.

The innermost convolution of the heating element 54 extends away from the plane in which the intermediate convolutions are wound and toward a slotted rivet 70 and is secured thereto. The rivet 70 is of substantially the same diameter as the opening in the eyelet 68 and is pressed into the opening for frictional engagement therewith. The end of the outer convolution of the heating element 54 is crimped under a curled-over portion of the rim of the cup 60, so as to be permanently mechanically held thereby and electrically connected thereto. Alternately, the end of the coil could be secured by other mechanical means, or by welding, to the cup 60 in an electrically conductive manner. The cup has a plurality of spaced, inwardly extending projections 72 which are positioned to provide support for the outer convolutions of the heating element 54 when pressure is exerted against the opposite or frontal side thereof.

In accordance with the present invention there is provided in the socket a novel electrical switch connected in circuit with the heating element, and adapted to break the circuit and deenergize the element after useful incandescence has been reached. Associated with the electrical switch is a bimetallic operator or bimetallic member having an actuator portion which is free and clear of attachment to any other parts of the socket, the actuator portion being adapted for abutting engagement with one of the parts of the switch, in order to effect the actuation thereof.

As illustrated in FIGS. 1-3 the receptacle 12 comprises a socket in the form of a tubular body 74 constituting one of two contacts, the other of said contacts including a metal base member 76 as shown in FIGS. 6 and 7; the member has a generally cuplike configuration and is supported in the socket by means of an insulating block 78. The block is particularly shown in FIGS. 4 and 5, and has a shoulder of undercut surface 80 which receives corresponding fingers 82 of the base member 76, to thus hold the latter captive. The bottom wall of the base member 76 is provided with a shallow annular contact surface or trough 84, which is adapted to receive the bead-like rim or lip 86 of the heating element cup 60 when the manually-operable part comprising the spacer member 20 and knob 22 are depressed, as in FIG. 2. The bottom wall of the base member 76 which forms the trough 84 also provides an internal shoulder 88 of annular configuration, constituting a seat against which one face of the bimetallic member bears, such member being generally designated by the numeral 90. Spring means 92 are also provided, engageable with peripheral portions of the opposite face of the bimetallic member and seated against a shoulder 94 provided on the insulating block 78. As shown, the bottom wall of the base member 76 is dished somewhat, in order to provide clearance for the actuator portion of the bimetallic member 90 when the latter is in the position shown in FIG. 1, such position being hereinafter referred to as the closed-circuit position. In addition, the bottom wall of the base member 76 is provided with multiple apertures 96 (FIG. 7) which enable the bimetallic member 90 to receive heat by both conduction and radiation from the heating coil 54 when the manually operable part of the ignitor plug 14 is disposed in the position of FIG. 2.

Integral with the base member 76 is a tubular boss 98 which extends in a direction away from the ignitor plug 14, the boss 98 having an end face or contact face 100 constituting one of the cooperable parts of the electrical switch. As shown, the bimetallic member 90 has a central aperture through which the boss 98 extends. There is provided, cooperable with the face 100, a second electrical switch part, constituted as a contact cup 104 having a bottom wall with a central aperture 106, and an annular flange 108 which is adjacent to the lip of the cup.

The cup is particularly illustrated in FIGS. 10 and 11. A special electrically-conducting coil spring means of spring steel wire having a thick jacket of copper, is provided, engageable with the flange 108, for normally biasing the contact cup 104 into engagement with the contact face 100 of the tubular boss 98. Pressed into the insulating block 78 is a conducting stud 112, having a head 114 and a knurled portion 116 by which the stud is mechanically held. The head 114 of the stud is received in a recess in the block; one end of the spring means 110 is seated against the head, and the walls of the recess closely confine the convolutions of the spring means and prevent lateral shifting thereof. The stud is adapted to be connected to the "hot" terminal of the vehicle electrical system, in the usual manner, and the copper jacket of the spring means affords an excellent conducting medium while the steel core retains the resiliency.

The electrical switch further comprises an insulating bearing sleeve 118, particularly shown in FIGS. 8 and 9, disposed between the walls of the boss 98 and the walls of the contact cup 104. Integral with the sleeve 118 is a spacer 120 of annular configuration, which is disposed between the flange 108 of the contact cup 104 and the actuator (central) portion of the bimetallic member 90. The sleeve and spacer are referred to in some of the appended claims as a "flanged bushing". The sleeve 118 functions to maintain the contact cup 104 centralized with respect to the tubular boss 98, with the insulating spacer 120 maintaining the actuator portion of the bimetallic member 90 out of electrical contact with the flange 108. As a result, no current will flow through the actuator portion of the bimetallic member 90, even when a flow is established through the heating element 54. Accordingly all portions of the bimetallic member are at substantially the same electrical potential. This has several important advantages, which will be outlined below.

Referring again to FIGS. 1-3 and in accordance with the present invention, tubular metal body 74 is provided with a rolled thread formation 122 providing both internal and external screw threads. Cooperable with the internal threads are corresponding projections 124 on the insulating block 78, optionally as in the form of mating integral threads adapted to engage the internal threads formed by the rolled thread formation 122. With such an arrangement, the insulating block 78 can be merely screwed into place in the socket or receptacle 12, and held captive therein. This construction also permits the use of automatic assembly equipment, which has the important advantage of reducing the overall cost of the device.

Further in accordance with the invention, the rolled thread formation 122 provides external threads adapted to be engaged by cooperable threads 128 on a tubular screw shell 130 which is adapted to engage the rear surface of a mounting panel such as the dashboard 18 of the automobile. The threads of the shell can optionally be in the form of a rolled thread formation. It has been found that the internal and external threads provided by the single rolled thread formation 122 can very conveniently accommodate both the projections or threads 124 on the insulating block 78 and the threads on the tubular shell 130. A substantial saving is thereby realizable, not only from the standpoint of reducing the number of separate pieces required, but also minimizing both the assembly time and the installation time required for such units.

The insulating block 78 has a hollow tubular projection 132 which extends through a central aperture in the transverse end wall 134 of the socket, in order to centralize the block and provide an insulating barrier between the stud 112 and wall 134.

The operation of the improved cigar lighter of the present invention can now be readily understood by referring to FIGS. 1-3 in succession. FIG. 1 illustrates the various parts of the lighter in the unenergized or storage position. The bimetallic member 90 is disposed in the "cold" or closed-circuit position. The spring 92 engages one face of the bimetallic member and holds it against the shoulder 88 provided in the bottom wall of the base member 76. In addition, the spring 110 maintains the engagement of the contact cup 104 with the contact face 100 of the tubular projection 98. The central aperture 106 in the contact cup 104 enables a more uniform contact pressure between the cup 104 and projection 98 to be had, since a limited amount of yielding of the walls immediately surrounding the aperture 106 can occur. This has been found to be desirable from the standpoint of maintaining reliable contact between these two parts, particularly over a prolonged period of use.

When it is desired to actuate the lighter, the user merely depresses the knob 22 to advance the tubular spacer member 20 and heating element cup 60 to an "energizing" position, such that the cup rim 86 engages the walls of the trough 84, thereby establishing at the location of the cup 60, a complete circuit through the heating element 54 as follows: Current flows from the stud 112 through the spring 110 to the contact cup 104, to the tubular projection 98 and base member 76, to the rim 86 of the heating element cup 60, through the heating element 54 and to the stud 70, and thereafter to the spacer member 20 which is at roughly the same electrical potential as the dashboard 18 by virtue of its engagement with the friction sleeve 24 and ashguard 26. The parts have the relative positions shown in FIG. 2. It will be understood that in the present construction, the user must hold the knob in the position of FIG. 2 while the element is heating. As this occurs, heat is radiated through the apertures 96 in the bottom wall of the base member 76, and will strike the bimetallic member 90. After several seconds, the bimetallic member 90 will shift from its cold position to its hot or circuit-opening position as illustrated in FIG. 3, such movement effecting a shifting of the contact cup 104 to the position shown, thereby breaking the circuit between the cup and the tubular projection 98 at the location of the latter, and de-energizing the heating element. The shifting of the bimetallic member is accomplished by an audible "click", which signals to the user that the ignitor plug is ready to be removed. Due to the frictional engagement of the ashguard 26 with the wall of the body 74, the ashguard will initially remain stationary as the knob 22 and spacer member 20 are withdrawn from the socket, until there occurs engagement of the curl 42 and teeth 44, after which the ashguard will move with the spacer member 20 and friction sleeve 24 as a unit. Such an arrangement provides for a retraction of the heating element 54 and cup 60 within the ashguard by ¼ inch or so, at such time as the ignitor plug 14 is removed from the socket 12. Following use of the lighter, the ignitor plug is merely reinserted into the socket, and the knob 22 depressed a slight amount until the engagement of the flanges 46, 48 occurs, that is, until the parts have once again assumed the relative positions shown in FIG. 1.

Figure 15:
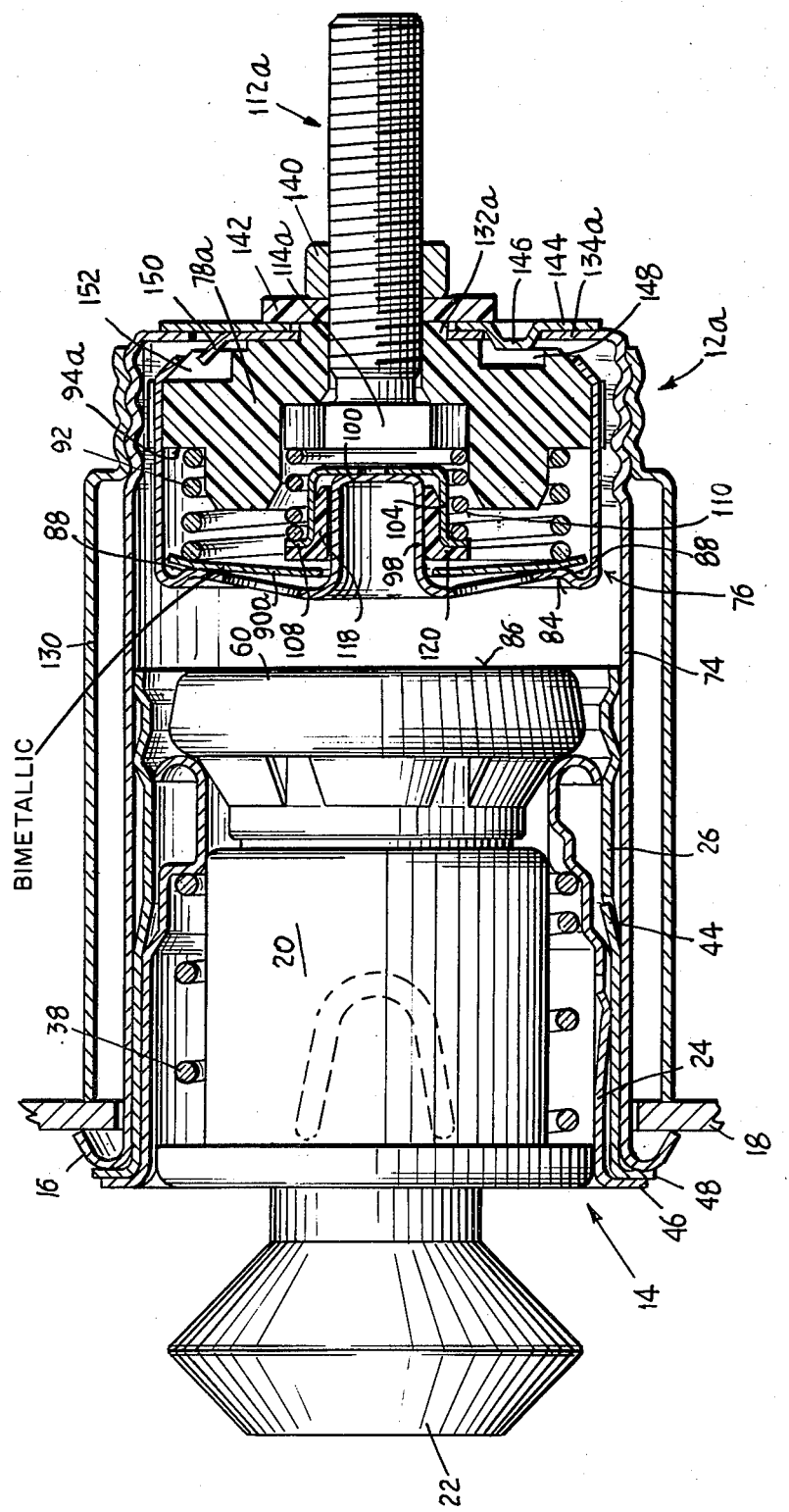
FIG. 15 is a vertical sectional view of a somewhat modified cigar lighter, employing a simplified form of insulating block in the receptacle, and incorporating the formed, bimetallic member of FIGS. 12-14.

FIG. 15 illustrates another form of the invention, particularly showing a modified manual electric cigar lighter employing a unique bimetallic member having a formed peripheral portion which provides a spring-action return of the member from its hot, circuit-opening position to its cold, closed-circuit position. Like reference numerals in FIGS. 1–3 and 15 are intended to designate similar parts. The cigar lighter comprises a socket 12a and an ignitor plug 14 having a manually operable part in the form of a tubular spacer member 20 and knob 22, a friction sleeve 24, and ashguard 26. The socket has tubular body 74 constituting an electrical contact, and a base member 76 which is substantially identical to that shown and described in connection with the embodiment of FIGS. 1–3. The heating element (not shown) is disposed within a cup 60, the latter having a curled rim 86 which is adapted to engage the walls of an annular trough 84 provided in the bottom wall of the base member 76.

Figure 16:
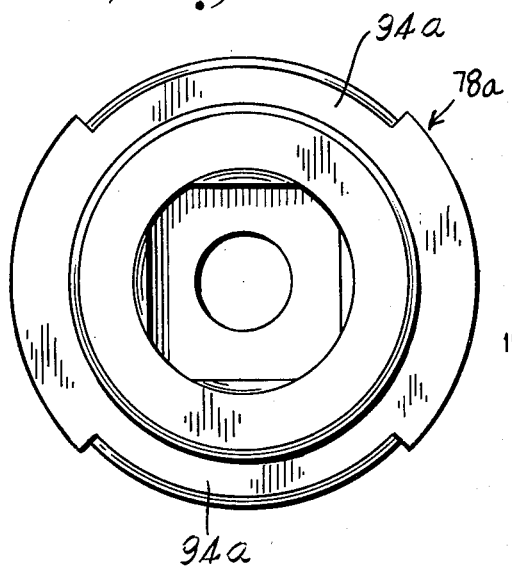
FIG. 16 is a left end elevation of the insulating block carried by the holder device of the lighter of FIG. 15.
Figure 17:
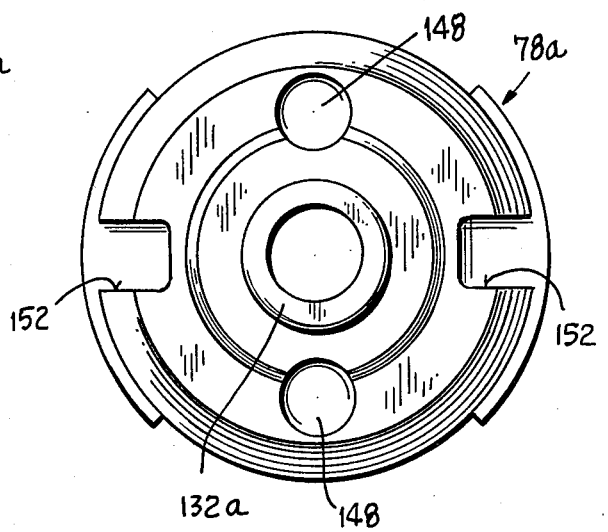
FIG. 17 is a right end elevation of the insulating block of FIG. 16.

Supporting the base member 76 in the socket 12a there is provided a somewhat modified insulating block 78a, particularly illustrated in FIGS. 16 and 17. The block has an annular shoulder 94a constituting a seat for one end of a spring 92, the other end of the spring bearing against one face of a bimetallic member 90a. The other face of the member 90a is seated against a shoulder 88 provided in the bottom wall of the base member 76, as in the previous embodiment. Integral with the base member 76 is a tubular boss 98 having a contact face 100, this constituting one part of an electrical switch which is connected in circuit with the heating element that is carried by the ignitor plug. The other part of the switch comprises a contact cup 104, which carries a bearing sleeve 118 having a peripheral flange constituting a spacer 120. The contact cup also includes a flange 108, constituting a seat for the spring means 110, the latter also bearing against the head 114a of a stud 112a. The socket 12a has a transverse end wall 134a with a central aperture which receives a tubular projection 132a of the insulating block 78a so as to maintain the latter centralized. The stud 112a carries a nut 140 and insulating washer 142. Interposed between the washer 142 and the wall 134a is a metal washer 144 having a projection 146 which is received in a recess in the wall 136a, for keying the washer thereto. The adjacent portion of the insulating block 78a has a shallow recess 148 which provides clearance for the projection 146. A tooth 150 is stamped out from the wall 134a and is received in an additional recess 152 in the insulating block 78a. The engagement of the tooth 150 and the walls of the recess 152 effects a proper rotational orientation of the insulating block 78a with respect to the remainder of the socket 12a as the washers 142, 144 and nut 140 are installed on the stud 112a.

By the present invention there is provided a unique dishlike configuration to the bimetallic member 90a which provides a spring-return of the member from its hot, circuit opening position to its cold, closed-circuit position.

Figure 13:
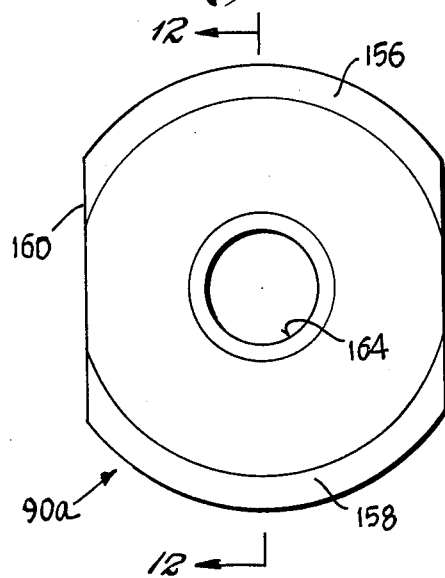
FIG. 13 is a front elevation of the bimetallic member of FIG. 12.
Figure 12:
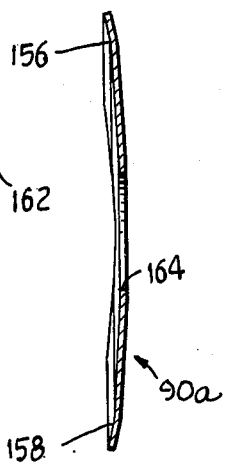
FIG. 12 is an axial section of a novel bimetallic switch actuator member employed with a somewhat modified cigar lighter illustrated in FIG. 15, said member having a formed periphery to provide a positive spring return from its hot position to its cold position.
Figure 14:
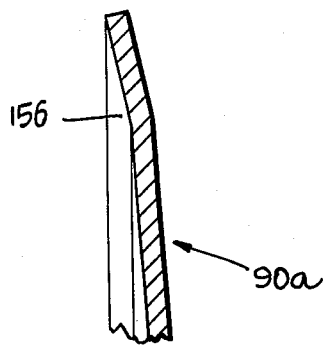
FIG. 14 is an enlarged fragmentary axial section of the member of FIG. 12.

Referring to FIGS. 12–14, it can be seen that the periphery of the member 90a is formed with a first shallow, partially circular trough 156, and a second shallow trough 158, both of which are disposed on the concave side of the member 90a, this being the high-expansion side. As shown, the opposite ends of the member 90a are slabbed off to provide substantially straight cut edges 160, 162. The central aperture 164 enables the member 90a to be carried in the socket 12a as shown, with the tubular projection 98 extending therethrough. The dimension of the aperture 164 is sufficiently large such that no engagement of the bimetallic member 90a with the walls of the tubular projection 98 normally occurs. The formed periphery as outlined above has been found to be very effective in insuring that the bimetallic member, once cooled, returns to its closed-circuit position. As mentioned above, little or no additional expense is involved in fabricating such members, since the punch from which they are stamped can be initially made to incorporate the form required to produce the troughs, and accordingly such members can be mass produced in the conventional manner.

The above constructions are seen to have a number of distinct advantages which were not enjoyed by many of the devices of the prior art. As pointed out above, the bimetallic member is not a part of the circuit which carries the heating element current, and accordingly there is not encountered a self heating effect due to current flowing through the member itself. Accordingly there are eliminated from the design problems associated with contact resistances of the member, and physical changes due to aging thereof. Due to the fact that the bimetallic member itself is not employed as a contact per se, there occurs no arcing or pitting which would lead to deterioration of the member and possible malfunctioning.

Since the member remains virtually unmodified when installed in the lighter, it enjoys the inherent reliability of a simple bimetal part. Since it is not riveted, staked, welded or otherwise physically altered, the chances of the member suffering degeneration are greatly reduced or eliminated. Moreover there is nothing to interfere with the normal snap or flexing movements of the member, once installed, since the periphery is held against the annular shoulder of the base member by the spring; the central actuator portion is free and unattached, and during the normal operation merely abuts one of the parts of the electric switch, as opposed to being physically joined or connected thereto in a permanent manner.

With the present construction, the insulating block can be conveniently molded in plastic, as opposed to prior devices wherein ceramic materials were required. The use of plastic is permitted as a result of the shielding effect provided by the base member 78 and the fact that the bimetallic member 90 is disposed in the path between the heating element and the insulating block; with such an arrangement, the bimetallic member intercepts substantially all of the heat which would otherwise impinge on the block, and prevents the latter from being damaged. It can be readily appreciated that the use of a plastic part constitutes a distinct economy over the use of similar parts constituted of ceramic materials.

Considerable cost saving is realizeable as a result of the single rolled thread formation on the tubular body of the receptacle, which provides both internal threads for engagement with the insulating block and external threads to mate with the corresponding threads of the screw shell. Such economics are of great importance as far as the automobile manufacturers are concerned, as was pointed out earlier, and the various features of the present lighter construction have been found to lend themselves extremely well to low-cost, high production manufacturing procedures.

The device is thus seen to represent a distinct advance and improvement in the technology of cigar lighters.

Each and every one of the appended claims defines a distinct aspect of the invention separate from the others, and each claim is accordingly to be treated in this manner when the prior art devices are examined in any determination of novelty of validity.

Variations and modifications are possible without departing from the spirit of the invention.

What is claimed is:

1. A cigar lighter, comprising in combination:
   (a) a holder device including a socket having two electrical contacts forming part of a cigar lighter electrical circuit,
   (b) an ignitor plug receivable in the socket and constituting a manually-operable part movable in the socket between energizing and de-energizing positions,
   (c) said plug having an electrical resistance heating coil carried at its inner end,
   (d) means for establishing an electrical circuit from the holder device electrical contacts through the heating coil when the said plug is shifted to its energizing position, said means including an electrical switch having relatively-movable cooperable electrical contact parts, all of which are carried by the holder device, and
   (e) means responsive to heating to said heating coil, for actuating said electrical switch to break said electrical circuit and de-energize the coil, said means including a bimetallic member carried by said holder device and having a circuit-opening position and a closed-circuit position, said bimetallic member carrying no electrical current and having an actuator portion which is free and clear of permanent attachment to any other parts, said actuator portion being adapted for abutting engagement with one of the cooperable electrical contact parts of said electrical switch to effect the actuation thereof.

2. The invention as set forth in claim 1, and further including:
   (a) means mounting said bimetallic member in the holder device to maintain said bimetallic actuator portion isolated from the electrical current flowing through the heating coil electrical circuit when the member is in its closed-circuit position.

3. The invention as set forth in claim 1, wherein:
   (a) the inner end of the ignitor plug comprises a metal cup in which the heating coil is disposed,
   (b) one of said socket electrical contacts comprising a metal base member,
   (c) said base member having an annular electrical contact surface engageable with the lip of said metal cup when the manually operable part is actuated.

4. The invention as set forth in claim 1, wherein:
   (a) one of said socket electrical contacts comprises a metal base member, and
   (b) an electrically insulating block for insulatedly mounting the base member in the holder device.

5. The invention as set forth in claim 4, wherein:
   (a) said base member has a cup-like configuration,
   (b) said bimetallic member being disposed within said base member,
   (c) said base member having an internal shoulder against which one face of the bimetallic member bears, and
   (d) spring means carried by the electrically insulating block and disposed within said base member, engaging the opposite face of the bimetallic member and biasing the latter against the said internal shoulder.

6. The invention as set forth in claim 5, wherein:

(a) the spring means engages solely peripheral portions of the bimetallic member.

7. The invention as set forth in claim 5, wherein:
(a) said electrically insulating block has a shoulder constituting a seat for one end of the spring means.

8. The invention as set forth in claim 4, wherein:
(a) said electrically insulating block has means defining multiple undercut surfaces,
(b) said metal base member comprising multiple fingers adapted to be received by and to extend into said undercut surfaces, respectively, for mechanically securing the electrically insulating block and base member together.

9. The invention as set forth in claim 4, wherein:
(a) the bottom wall of said base member is dished to provide clearance for the actuator portion of the bimetallic member when the latter is disposed in its closed-circuit position.

10. The invention as set forth in claim 5, wherein:
(a) the bottom wall of the base member has multiple apertures,
(b) the bimetallic member being disposed closely adjacent said apertures whereby heat from the heating coil which passes through the apertures will impinge upon it.

11. The invention as set forth in claim 4, wherein:
(a) the inner end of the ignitor plug comprises a metal cup in which the heating coil is disposed,
(b) said base member having an apertured wall disposed broadside and in close proximity to the heating coil and cup when the cigar lighter is actuated,
(c) said bimetallic member being disposed on the opposite side of and in close proximity to the apertured wall whereby it readily receives heat from the heating coil, by both conduction and radiation.

12. The invention as set forth in claim 11, wherein:
(a) said bimetallic member is disposed in a path between the heating coil and the electrically insulating block, the bimetallic member thereby intercepting heat which would otherwise strike the block, and preventing it from reaching the same.

13. The invention as set forth in claim 1, wherein:
(a) the inner end of the ignitor plug comprises a metal cup in which the heating coil is disposed,
(b) the lip of the metal cup being curled inwardly, presenting an annular, bead-like surface,
(c) one of said socket electrically contacts comprising a metal base member,
(d) said base member having a shallow annular trough engageable by the bead-like surface of the metal cup when the cigar lighter is actuated.

14. The invention as set forth in claim 1, wherein:
(a) one of said socket electrical contacts comprises a metal base member,
(b) an electrically insulating block for insulatedly mounting the base member in the holder device,
(c) said base member having a centrally disposed tubular boss with an electrical contact face at its end, said boss constituting one of said switch electrical contact parts,
(d) the other of said switch electrical contact parts comprising a contact cup disposed adjacent the base member, said contact cup having a bottom wall engageable with the electrical contact face of the tubular boss.

15. The invention as set forth in claim 14, and further including:

(a) spring means engageable with said contact cup and normally biasing it into engagement with said electrical contact face.

16. The invention as set forth in claim 14, wherein:
(a) said switch includes an electrically insulating bearing sleeve between the tubular boss and the contact cup, so that the latter can slide axially within limits with respect to the boss.

17. The invention as set forth in claim 14, wherein:
(a) said switch includes an electrically insulating spacer between the actuator portion of the bimetallic member and the contact cup, for preventing electrical current from flowing from the contact cup to the said actuator portion and resulting in resistance heating of the bimetallic member.

18. The invention as set forth in claim 16, wherein:
(a) said switch includes an electrically insulating spacer between the actuator portion of the bimetallic member and the contact cup, for preventing heavy electrical current from flowing from the contact cup to the said actuator portion, and resulting in resistance heating of the bimetallic member,
(b) the spacer and bearing sleeve being integral with one another and comprising a flanged bushing.

19. The invention as set forth in claim 1, wherein:
(a) all portions of the bimetallic member are at substantially the same electrical potential, whereby there occurs virtually no resistance heating of the bimetallic member due to current flowing therethrough.

20. The invention as set forth in claim 4, wherein:
(a) said holder device is substantially cylindrical and has a transverse end wall with an aperture,
said electrically insulating block having a hollow tubular projection extending into said aperture for positioning the block with respect thereto,
(c) an electrically conducting stud carried in the hollow projection and adapted to be connected to a source of voltage, and
(d) spring means engageable with one of said switch electrical contact parts and said electrically conducting stud, for establishing electrical connection from the stud to said switch.

21. The invention as set forth in claim 14, wherein:
(a) said contact cup has an aperture in its bottom wall,
(b) the surface of the cup surrounding the aperture being engageable with the electrical contact face of the boss.

22. The invention as set forth in claim 20, wherein:
(a) said electrically insulating block has a recess,
(b) said electrically conducting stud having a head receivable in said recess,
(c) said stud head constituting a seat for the spring means associated with the said one switch electrical contact part.

23. The invention as set forth in claim 20, wherein:
(a) said electrically conducting stud has a knurled body portion adapted to be pressed into and permanently held in the hollow tubular projection of the electrically insulating block.

24. The invention as set forth in claim 15, wherein:
(a) said contact cup has an annular flange adjacent its lip, constituting a seat for one end of the said spring means.

25. The invention as set forth in claim 22, wherein:
(a) said spring means associated with the said one switch electrical contact part comprises a cylindrical coil spring, (b) the walls of the recess closely confining the convolutions of the coil spring and preventing lateral shifting thereof.

26. The invention as set forth in claim 14, wherein:
(a) said bimetallic member has a disk-like configuration, and has a central aperture,
(b) the tubular boss of the base member extending through the aperture in the bimetallic member, and the walls of the aperture normally being spaced from and out of electrical contact with the boss.

27. The invention as set forth in claim 26, wherein:
(a) the actuator portion of the bimetallic member is disposed between the base member and the contact cup.

28. The invention as set forth in claim 27, wherein:
(a) the other of said switch electrical contact parts further comprises an electrically insulating spacer disposed between the actuator portion of the bimetallic member and the contact cup, and movable with the latter, for preventing electrical current from flowing from the contact cup to the said actuator portion and resulting in resistance heating of the bimetallic member.

29. The invention as set forth in claim 14, wherein:
(a) said base member has a cup-like configuration,
(b) said bimetallic member being disposed within said base member.

30. An electrical cigar lighter, comprising in combination:
(a) a holder device including a socket member having two electrical contacts forming part of a cigar lighter electrical circuit,
(b) an ignitor plug member receivable in the socket member, said plug member comprising a manually-operable part,
(c) said plug member having an electrical resistance heating coil carried at its inner end,
(d) means for establishing an electrical circuit from the holder device electrical contacts through the heating coil, said means including an electrical switch,
(e) means including a bimetallic operator having cold and hot positions, said operator being carried by one of said members and being adapted to open said electrical switch in response to its heating,
(f) said bimetallic operator being of dish-like configuration and having a formed peripheral portion defining a shallow arcuate trough which provides a spring-action return of the operator from its hot position to its cold position.

31. The invention as set forth in claim 30, wherein:
(a) said bimetallic operator comprises a substantially circular disk having oppositely disposed edge portions slabbed off.

32. The invention as set forth in claim 30, wherein:
(a) said formed peripheral portion defined a second shallow, arcuate trough disposed opposite to the first, providing a spring-action return of the operator from its hot position to its cold position.

33. A cigar lighter, comprising in combination:
(a) a holder device including an electrical socket having two electrical contacts forming part of a cigar lighter electrical circuit,
(b) an ignitor plug receivable in the socket,
(c) said plug having an electrical resistance heating coil carried at its inner end,
(d) means for establishing an electrical circuit from the holder device electrical contacts through the heating coil,
(e) means including an electrically insulating block for insulatedly mounting one of said electrical contacts in the holder device,
(f) said holder device comprising a tubular metal body having a rolled thread formation providing both internal and external screw threads on the body,
(g) said electrically insulating block having projecting means engageable with the internal threads whereby the block can be screwed into the body and held captive therein.

34. The invention as defined in claim 33, and further including:
(a) a tubular external shell carried on the tubular metal body, and having projections engageable with the external threads whereby the shell can be screwed onto the body,
(b) one end of the shell being adapted for engagement with the rear surface of an automobile mounting panel.

35. The invention as set forth in claim 33, wherein:
(a) said electrically insulating block is constituted of plastic,
(b) said projecting means comprising integral screw threads molded in the surface of the electrically insulating block.

36. The invention as set forth in claim 34, wherein:
(a) said projections comprise a rolled thread formation on the external shell.

37. The invention as defined in claim 1, wherein:
(a) the electrical circuit at one location is established in response to movement of the ignitor plug to a deep position in the socket,
(b) said electrical circuit at another location being broken in response to said heating of the heating coil.

38. The invention as defined in claim 1, and further including:
(a) detent means yieldably holding the ignitor plug in a shallow, de-energizing position in the socket, said means enabling the plug to be manually shifted to a deep, energizing position,
(b) said electrical switch being normally closed, and
(c) said plug, when moved to a deep, energizing position in the socket, establishing said electrical circuit through the electrical resistance heating coil.

* * * * *